United States Patent [19]

Trachman et al.

[11] Patent Number: 4,872,374
[45] Date of Patent: * Oct. 10, 1989

[54] PLANETARY TRANSMISSION APPARATUS HAVING A FOUR ELEMENT TORQUE CONVERTER

[75] Inventors: Edward G. Trachman, Birmingham; Shan Shih, Troy; John Arzoian, Dearborn, all of Mich.

[73] Assignee: Rockwell International Corporation, Pittsburgh, Pa.

[*] Notice: The portion of the term of this patent subsequent to Oct. 10, 2006 has been disclaimed.

[21] Appl. No.: 751,401

[22] Filed: Jul. 3, 1985

[51] Int. Cl.⁴ ............................................. F16H 47/06
[52] U.S. Cl. ........................................ 74/731; 74/759
[58] Field of Search ................ 74/759, 758, 762, 760, 74/730, 731, 763

[56] References Cited

U.S. PATENT DOCUMENTS

| | | | |
|---|---|---|---|
| 2,623,411 | 12/1952 | Herndon | 74/730 |
| 3,063,308 | 11/1962 | Wayman | 74/730 X |
| 3,083,589 | 4/1963 | Knowles et al. | 74/730 X |
| 3,103,832 | 9/1963 | Foerster | 74/759 |
| 3,797,332 | 3/1974 | Cameron et al. | 74/763 |
| 3,812,739 | 5/1974 | Mori et al. | 74/763 |
| 3,986,413 | 10/1976 | Stockton | 74/762 X |
| 4,233,861 | 11/1980 | Gaus et al. | 74/763 |
| 4,483,215 | 11/1984 | Ishimaru et al. | 74/759 |

FOREIGN PATENT DOCUMENTS

| | | | |
|---|---|---|---|
| 46-19881 | 3/1971 | Japan | 74/758 |
| 1295549 | 11/1972 | United Kingdom | 74/763 |

Primary Examiner—Dwight G. Diehl

[57] ABSTRACT

A transmission has a torque converter with an impeller, primary and secondary turbines and a stator. In a first planetary gear set the carrier is connected to the primary turbine, the sun gear is connected to the secondary turbine and the ring gear is connected to a one-way clutch. A second planetary gear set has a second carrier connected to the output shaft and a second ring gear connected to the first carrier. A brake is connected to the one-way clutch and to the second sun gear for low forward operation. The one-way clutch is used in the first phase of low forward and in reverse. A clutch locks up the second planetary gear set in drive operation. The one-way clutch is centrifically disabled before and during drive operation. A second brake brakes the primary turbine, the first carrier, and the second ring gear in reverse operation, causing the secondary turbine to drive the first sun gear and the first ring gear to drive the second sun gear through the one-way clutch to turn the output shaft slowly in reverse. A second one-way clutch connected to the stator provides phase differentiation in low forward and drive operations.

11 Claims, 4 Drawing Sheets

PLANETARY TRANSMISSION APPARATUS HAVING A FOUR ELEMENT TORQUE CONVERTER

BACKGROUND OF THE INVENTION

This invention relates to transmissions which use torque converters and planetary gearing and particularly those in which plural power paths are provided between the torque converters and the planetary gearing.

In transmissions of the type provided by the present invention, and in all transmissions, it is highly desirable to decrease weight and to increase strength and reliability while improving efficiency. While the achievement of any one of those goals may be more or less difficult, the achievement of all of the goals at the same time presents a complex problem, or, more appropriately many complex interrelated problems.

Creating high torque and high efficiencies, especially at low speed ranges, creates a special problem or group of problems.

The present invention seeks to advance solutions to those problems by providing transmission apparatus and methods of operation which accomplish the stated goals, uniquely using fewer parts. The unique use of fewer parts inherently advances solutions of weight reduction, improves strength, and reliability.

The present invention resides in the unique reduction of parts and in the unique interrelationship of parts to solve the problems and to approach the stated goals.

SUMMARY OF THE INVENTION

A transmission has a torque converter with an impeller, primary and secondary turbines and a stator. In a first planetary gear set a carrier is connected to the primary turbine, a sun gear is connected to the secondary turbine and a ring gear is connected to a one-way clutch. A second planetary gear set has a second carrier connected to the output shaft and a second ring gear connected to the first carrier. A brake is connected to the one-way clutch and to the second sun gear for low forward operation. The one-way clutch is used in the first phase of low forward and in reverse. The one-way clutch is centrifically disabled during drive operation. A clutch locks up the second planetary gear set in drive operation. A second brake brakes the primary turbine, the first carrier, and the second ring gear in reverse operation, causing the secondary turbine to drive the first sun gear and the first ring gear to drive the second sun gear through the one-way clutch to turn the output shaft in reverse. A one-way clutch connected to the stator provides phase differentiation in low forward and high forward drive operations.

The transmission includes a four element torque converter with an impeller, a main turbine and auxilary turbine and two planetary gearing systems. The main turbine drives the carrier in the first planetary system and the auxiliary turbine drives the sun gear. The first carrier is connected to the second ring gear, and the output is taken from the second carrier.

Arrangement of parts provides six forward speeds and reverse from a small number of moving parts. At a low speed inputs of the main and auxiliary turbines are added in the first planetary system and the first ring gear is braked by a one-way clutch.

In the second low gear the main turbine and auxiliary turbine rotate at the same speed, the entire first planetary system rotates at the same speed, and a one-way clutch permits the ring gear to rotate. In high gear the brake is released and a first clutch makes the second planetary system rotate as a unit. An additional forward drive is provided by lock up of the torque converter to provide direct drive. A second one-way clutch or the stator provide two phases of low and high gear. The system provides a deep reverse by braking the main turbine, the first carrier and the second ring gear. The auxiliary turbine drives the first sun gear which drives the first ring gear, which in turn through the one-way clutch drives the second sun gear. Output is taken from the second carrier.

The invention provides an automatic transmission apparatus comprising an input shaft, an output shaft, a four element torque converter having an impeller connected to the input shaft, a primary turbine, a secondary turbine, and a stator arranged in fluid flow sequence in which the impeller delivers fluid to the secondary turbine and then to the primary turbine and in which the fluid returns from the primary turbine via the stator to the impeller. First and second planetary gear sets are connected to the turbines. The first gear set has a first planet gear carrier connected to the primary turbine for turning with the primary turbine and has a first sun gear connected to the secondary turbine for turning with the secondary turbine and has a first ring gear. A one-way clutch is connected to the first ring gear. The second planetary gear set has a second ring gear connected to the first planet carrier, a second planet carrier connected to the output shaft and a second sun gear connected to the one-way clutch. A first clutch is connected to the second sun gear and to the second ring gear. A brake is connected to the primary turbine. Another brake is connected to the one-way clutch and to the second sun gear, and a second clutch connected to the input shaft and to the output shaft.

In the preferred transmission apparatus a low forward speed relationship is established between the input shaft and the output shaft by securing the second brake. That secures the second sun gear and the one-way clutch, thereby holding the first ring gear with the one-way clutch. Power is transmitted from the primary turbine to the first planet carrier, and power is transmitted from the secondary turbine to the sun gear and is added to the planet carrier. Power output from the first planet carrier is transmitted to the second ring gear and then to the second planet carrier and then to the output shaft.

Preferably the one-way clutch is active until relative speed of the primary turbine and impeller increases to predetermined ratios. The one-way clutch becomes inactive upon relative speed of the primary turbine and the impeller increasing to predetermined ratios.

In a preferred embodiment a second one-way clutch is connected to the stator and to ground. The second one-way clutch is active until relative speed of the primary turbine and impeller reaches a predermined value.

The second one-way clutch becomes inactive when relative speed of the primary turbine and impeller reaches a predetermined value.

In a forward drive relative of the preferred transmission the first clutch is activated locking the second ring gear to the second sun gear and thus locking the second planetary gear set. Power from the primary turbine is transmitted through the first carrier and is transmitted directly through the locked up secondary planetary gear set to the output shaft.

Preferably the one-way clutch is held inactive when the first clutch is engaged.

In a preferred embodiment a centrifugal element connected to the one-way clutch to deactivate the clutch upon its speed exceeding a predetermined amount.

In the drive condition a second one-way clutch connected to the stator and to ground, and wherein the second one-way clutch is active until relative speed of the primary turbine and impeller reaches a predetermined value. The second one-way clutch becomes inactive when relative speed of the primary turbine and impeller reaches a predetermined value.

Preferably a reverse arrangement between the input shaft and the output shaft is effected by engaging the first brake, thereby locking the primary turbine, the first planet carrier and the second ring gear. Power is transmitted by the secondary turbine through the first sun gear and first planet gears to the first ring gear from there throught the one-way clutch and through the second sun gear to the second carrier and then to the output shaft in the reverse direction.

A preferred transmission apparatus comprises a first planetary gear set having a first sun gear, first planet gears, a first planet gear carrier, and a first ring gear, a second planetary set having a second sun gear, second planet gears, a second planet gear carrier and a second ring gear. A clutch is connected to the second ring gear and the second sun gear for selectively locking the second ring and sun gears and thereby locking the second planetary set. A brake is connected to the second sun gear. A one-way clutch is connected to the brake and the first ring gear is connected to the one-way clutch. Input means connected to the first planetary set and output means is connected to the secondary planetary set.

Preferably the input means comprises plural input means connected to the first planetary set.

Preferably a brake is connected to one of the input means.

In a preferred embodiment the output means is connected to the second planet gear carrier.

Preferably the input means comprises first input means connected to the first planet gear carrier and second imput means connected to the first sun gear.

A preferred embodiment provides means for deactivating the one-way clutch upon input means exceeding a predetermined speed.

Preferred deactivating means comprises centrifical deactivating means connected to the one-way clutch for centrifically deactivating the one-way clutch.

In a preferred embodiment a torque converter is connected to the input means. The torque converter has an input shaft, an impeller connected to the input shaft, a primary turbine in fluid communication with the impeller, a secondary turbine in fluid communication with the impeller, and a stator in fluid communications with the impeller and turbines. A second one-way clutch is connected to the stator and to ground. The input means comprise a first input connection between the primary turbine and the first carrier and a second input connection between the secondary turbine and the first sun gear.

A preferred method of controlling a transmission apparatus having an input shaft connected to an impeller which directs fluid against primary and secondary turbines and which receives return fluid from a stator and which has a first planetary gear set connected to the primary and secondary turbines and a second planetary gear set connected to the first planetary gear set and to an output shaft comprises braking a one-way clutch connected to a gear in the first planetary gear set and braking gear in the second planetary gear set and adding power from the primary and secondary turbines in the first planetary gear set.

Preferably the one-way clutch is released when power from the primary and secondary turbines are no longer additive in the first planetary gear set.

The preferred method holds the stator fixed with a second one-way clutch until the relative speed of the primary turbine approaches the speed of the impeller.

The preferred method releases the second one-way clutch and permits the stator to free wheel at the predetermined relative speed when torque on the stator is reduced.

The preferred method further comprises releasing the brake, engaging a clutch and locking up the second planetary gear set to provide a drive condition.

Preferably the first one-way clutch is deactivated while the clutch is engaged.

Preferably centrifugal force deactivates the one-way clutch.

The preferred method, in drive, holds the stator with a one-way clutch until speed of the primary turbine approaches a predetermined ratio with the speed of the impeller and releases the stator when the speed of the primary turbine exceeds a predetermined ratio as compared with the speed of the impeller and thereby creating a second forward drive phase.

The preferred method further comprises engaging a second clutch connecting an input shaft to an output shaft upon a predetermined output shaft speed thereby creating a direct drive.

The preferred method further comprises braking an input from the primary turbine to the first planetary gear set and thereby driving the output shaft via the secondary turbine, the first planetary gear set, the one-way clutch and the second planetary gear set thereby driving the output shaft in reverse.

In the preferred method the braking comprises braking the primary turbine, the planet carrier of the first planetary gear set and the ring gear of the second planetary gear set, and the driving comprises driving with the secondary turbine, the first sun gear, the first planets, the first ring gear, the one-way clutch, the second sun gear, and the second carrier which is connected to the output shaft.

These and further and other objects and features of the invention are apparent in the disclosure which includes the above and ongoing specification, including the claims and the drawings.

DETAILED DESCRIPTION OF THE DRAWINGS

Figure 1:
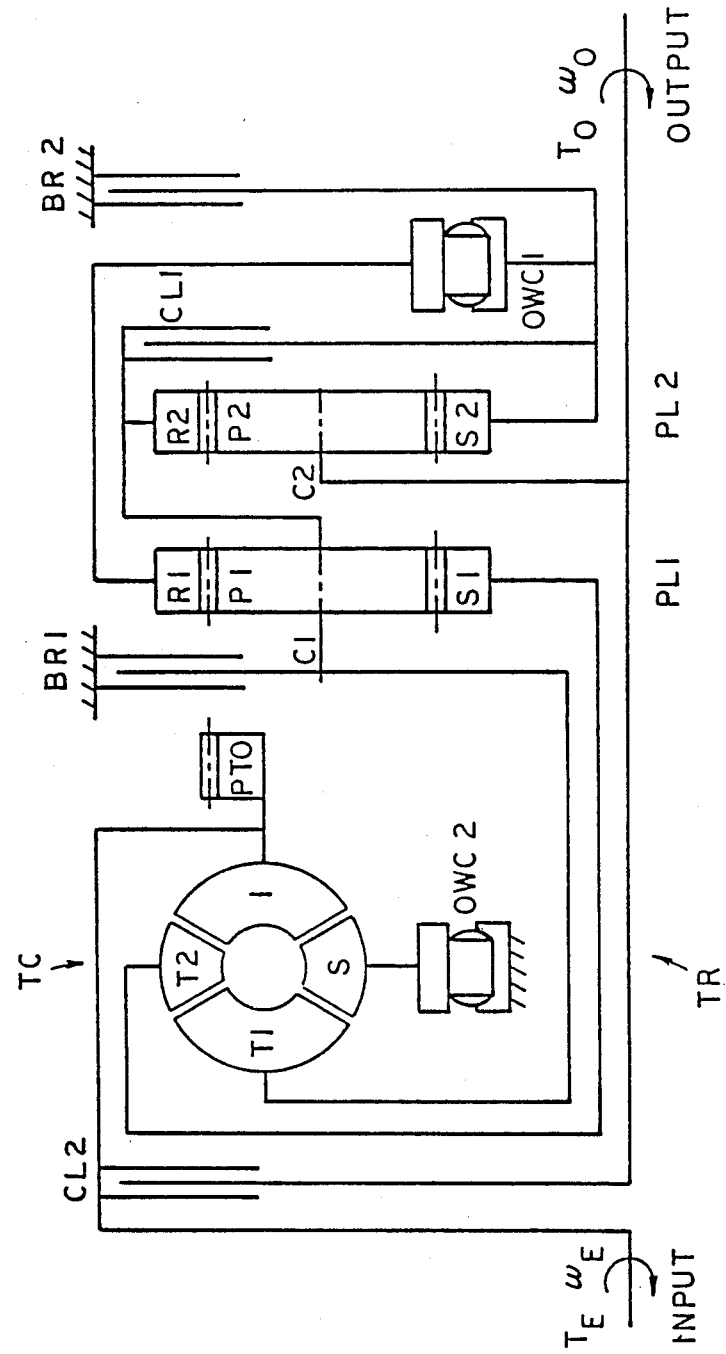
FIG. 1 is a schematic drawing of the transmission of the present invention.

Alphanumeric notations are used in the drawings to facilitate understanding of the invention.

Referring to FIG. 1 a transmission is generally indicated by the notation TR.

An INPUT shaft rotates as indicated in the direction of the arrow as driven by engine torque, $T_E$, at engine speed, $W_E$. The INPUT shaft drives a power take off, PTO. The INPUT shaft also drives the impeller, I, of a torque converter, Impeller, I, drives a primary turbine, T1, and a secondary turbine, T2. Fluid returns to the impeller via stator, S. Turbines T1 and T2 are connected to inputs of the first planetary gear set, PL1. The output of the planetary gear set, PL1, is connected to the input of the second planetary gear set, PL2, and the output of the second planetary set, PL2, is connected to the OUTPUT shaft, upon which the output torque, $T_O$, at speed, $W_O$ are produced.

Specifically, the primary turbine, T1, is connected to the carrier, C1, of planet gears, P1. The secondary turbine, T2, is connected to the sun gear, S1. At low speeds brake, bR2, is engaged. The secondary turbine, T2, which runs faster than the primary turbine, T1, tends to drive the ring gear, R1, in a reverse direction. One-way clutch, OWC1, prevents that reverse rotation. Consequently, the torques of the primary and secondary turbine are added in the first planetary set, PL1. The output torque taken from the carrier, C1, drives the ring gear, R2. Brake, BR2, brakes sun gear, S2 and one-way clutch OWC1. Ring gear, R2, slowly drives planet gears, P2, and the output is taken from carrier, C2. As the ratio N of the primary turbine speed to the impeller speed, T1/I, approaches a predetermined value, preferably 0.4, T2 stops delivering the high torque, and the one-way clutch, OWC1, runs freely, and the drive is taken from the primary turbine T1 through carrier C1 and ring gear R2 to carrier C2.

During that time stator, S, urges one-way clutch OWC2 in the first direction, locking the clutch during the phase 1 of the low forward speed when OWC1 is engaged. During the phase 2, OWC1 is disengaged and one-way clutch OWC2 is engaged. When the primary turbine, T1, reaches a predetermined speed ratio with the impeller, for example, about 0.9, one-way clutch, OWC2, free wheels, providing the third phase of low speed operation.

In high speed forward drive, brake BR2 is disengaged and clutch, CL1, is engaged, locking up the planetary set, PL2. Power is transferred from the primary turbine, T1, through carrier, C1, and the locked planetary set, PL2, to the OUTPUT shaft. In the first drive phase the speed of the primary turbine, T1, falls below a predetermined ratio, for example, 0.9 with the speed of the impeller, and the one-way clutch, OWC2, connected to stator, S, becomes active during the first phase of the drive condition.

As the speed of the primary turbine, T1, increases to above a predetermined value, for example, 0.9, T1/I, the stator discontinues its exersion of torque, and OWC2, is released, causing the second phase of the forward drive operation.

Finally, the clutch, CL2, is engaged for direct drive.

One-way clutch, OWC1, is disabled centrifugally when the speed exceeds a predetermined level so that the dropping of the speed of the primary turbine, T1, upon shifting into the high range will not reengage one way clutch, OWC1.

Brake, BR1, is engaged in reverse operation, braking the primary turbine, T1, carrier, C1, and ring gear, R2. Torque is transmitted from turbine, T2, through sun gear, S1, planets, P1, and ring gear, R1, to one-way clutch, OWC1, sun gear, S2, and carrier, C2, for reverse operation.

The operations of the one way clutches, OWC1 and OWC2, are automatic. The operation of the reverse control brake, BR1, is controlled manually. Low range may be selected manually, engaging brake, BR2. A high range selection automatically engages brake, BR2, at zero speed and then releases brake, BR2, and engages clutch, CL1, when torque and speed are interrelated in predetermined manners. Clutch, CL2, is engaged automatically upon a predetermined ratio of the speed of the primary turbine compared to the speed of the impeller, for example about 0.9.

Figure 2:
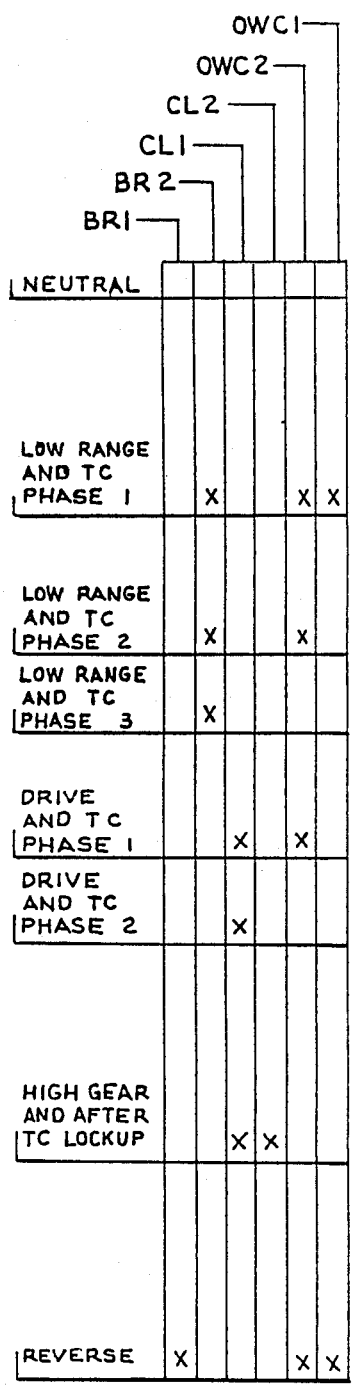
FIG. 2 is a chart of the control conditions for neutral, low, drive and reverse.

The ranges and the control conditions are shown in the chart in FIG. 2. The first column which indicates the On-Off control of Brake, BR1, is manually controlled. The second column indicates the Off-On condition of BR2 is manually controlled by moving a selector into low range. The second, third, and fourth columns are automatically controlled by moving a selector into high range. The last two columns are automatically controlled without change of selector.

Figure 3:
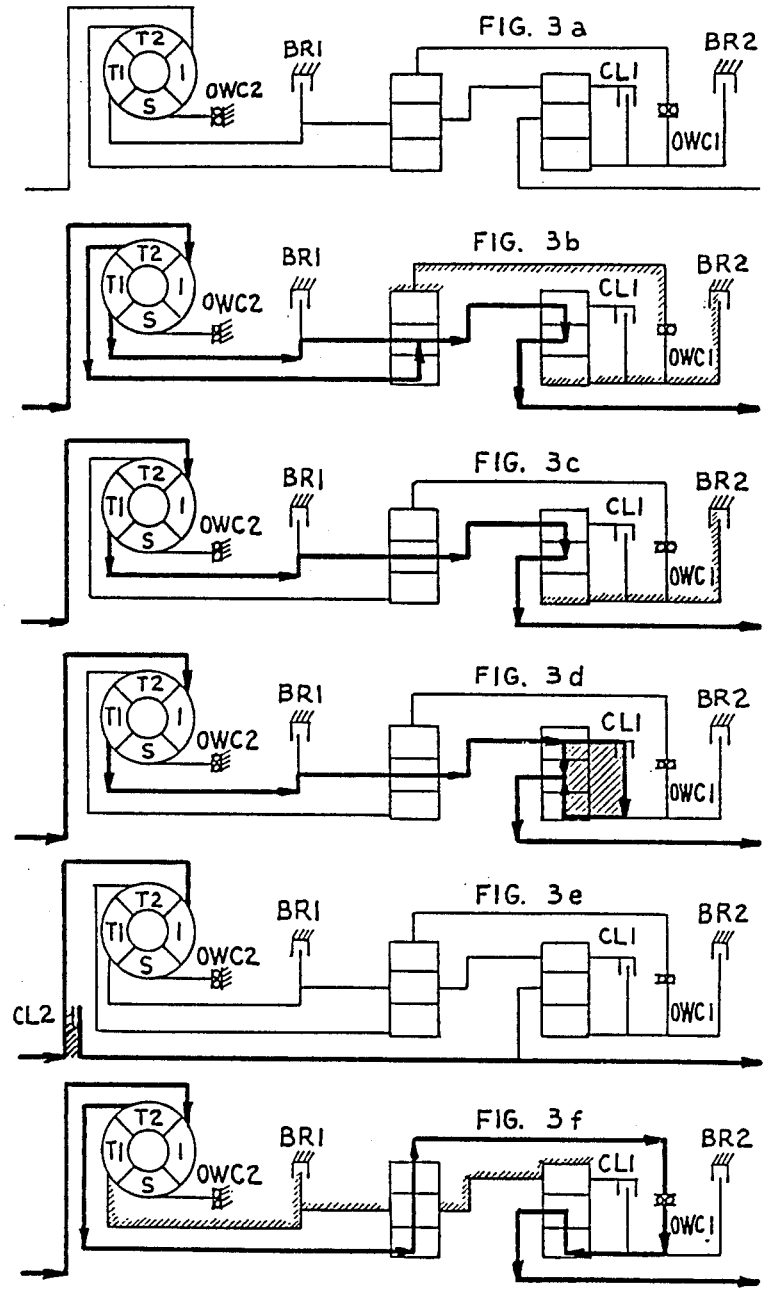
FIGS. 3a–3f is a group of schematic representations of power flow diagrams for the transmission operation according to the very controlled conditions as shown in FIG. 2.

FIG. 3 shows the active input and output drive conditions. In FIG. 3a the transmission is in neutral. In FIG. 3b the transmission is in low range and the one way clutch, OWC1, is active, providing a first phase. In FIG. 3c the transmission is in low range and the one way clutch, OWC1, is inactive. In a second phase one-way clutch, OWC2, is active, and in a third phase, OWC2, is inactive.

In FIG. 3d the transmission is in drive with the second planetary set locked. In FIG. 3e the system is in direct drive with the torque converter bypassed and input and outshafts in direct connection.

Figure 4:
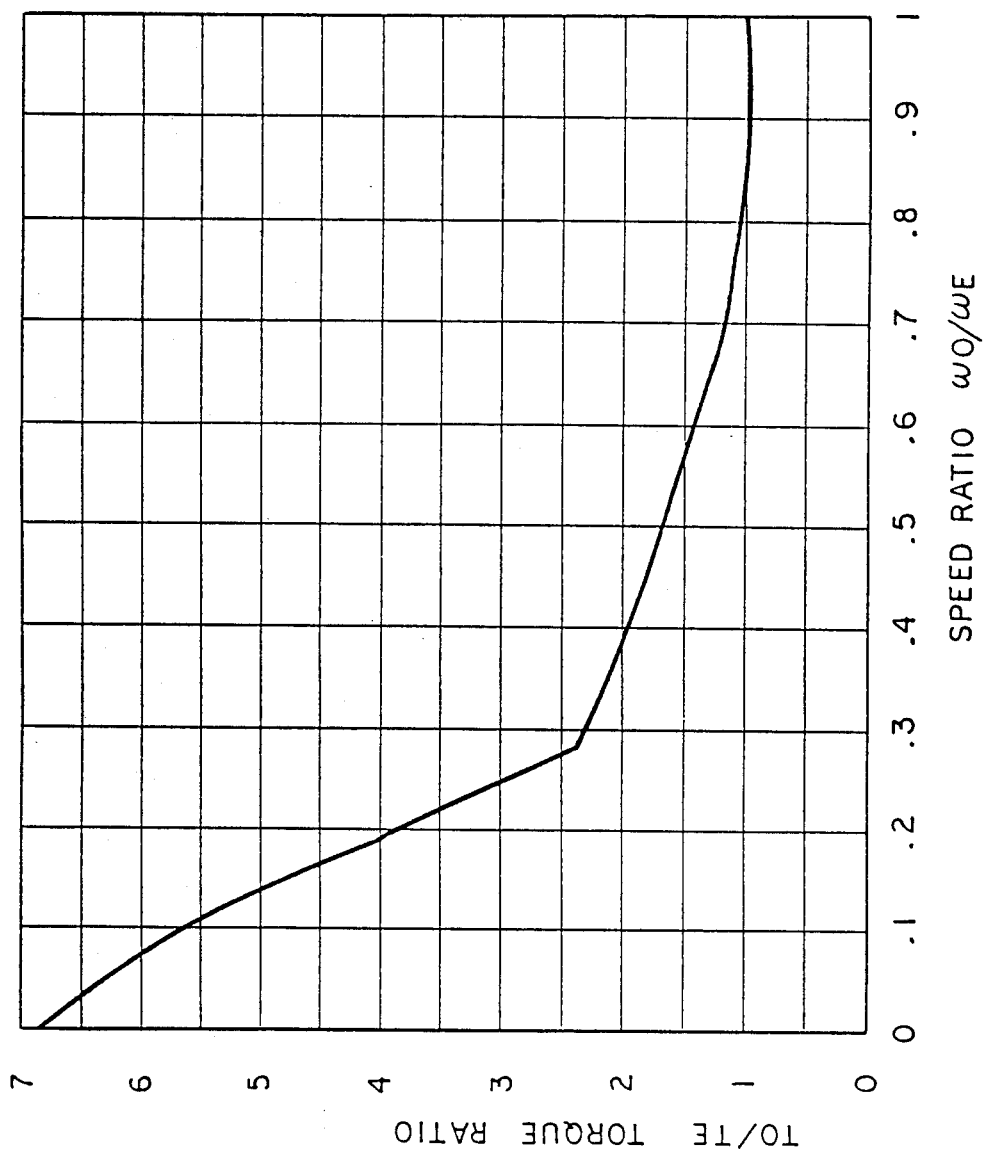
FIG. 4 compares the output torque ratio of the transmission to the speed ratio.
Figure 5:
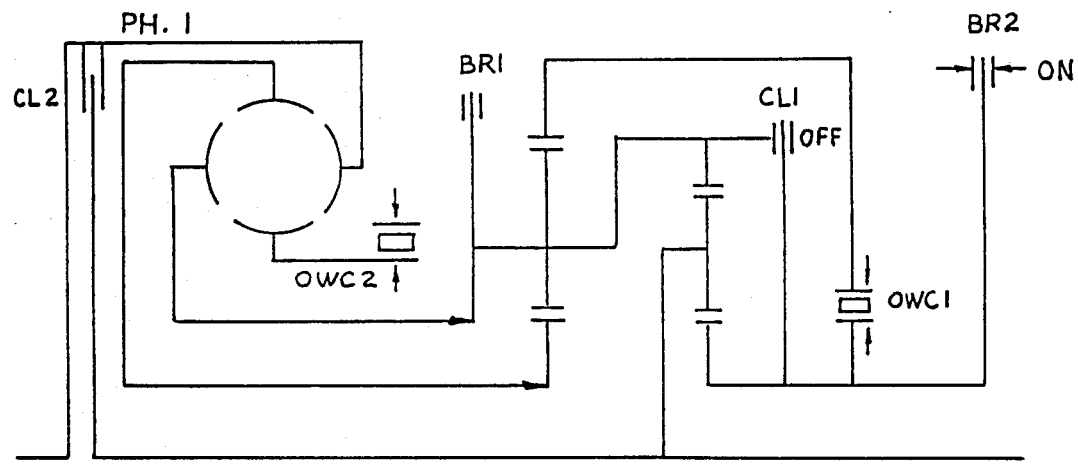
FIG. 5 is a schematic representation in chart form showing the varied control locations for different output operations of the transmission.

FIG. 4 represent the relationships output/input torque ratios and speed ratios.

As can be seen from FIG. 4, the present transmission provides high torque at low speeds, and the torque transitions to intermediate speed is substantially smooth.

FIG. 6 is a schematic chart of the control element conditions during the six identifiable forward speed phases, three in low forward range, two additional in forward drive range, and one additional in direct drive, and the reverse operations.

While the invention has been described in reference to specific embodiments, modifications, and variations of the invention may be constructed without departing from the scope of the invention. The scope of the invention is defined in the following claims.

We claim:

1. An automatic transmissin apparatus comprising an input shaft, an output shaft, a four element torque converter having an impeller connected to the input shaft, a primary turbine, a secondary turbine, and a stator arranged in fluid flow sequence in which the impeller delivers fluid to the secondary turbine and to the primary turbine and in which the fluid returns from the turbines via the stator to the impeller, first and second planetary gear sets, the first gear set having a first planet gear carrier connected to the primary turbine for turning with the primary turbine and having a first sun gear connected to the secondary turbine for turning with the secondary turbine and having a first ring gear, a one-way clutch connected to the first ring gear, the second planetary gear set having a second ring gear connected to the first planet carrier, a second planet carrier connected to the output shaft, a second sun gear connected to the one-way clutch, a first clutch connected to the second sun gear and to the second ring gear, a first brake connected to the primary turbine, a second brake connected to the one-way clutch and to the second sun gear, and a second clutch connected to the input shaft and to the output shaft.

2. The transmissin appratus of claim 1 comprising a low forward speed relationship established between the input shaft and the output shaft when the second brake is active and thereby securing the second sun gear and the one-way clutch and thereby holding the first ring gear with the one-way clutch, whereby power is transmitted from the primary turbine to the first planet carrier and power is transmitted from the secondary turbine to the first sun gear and is added to the first planet carrier and power output from the first planet carrier is transmitted to the second ring gear and then to the second planet carrier and then to the output shaft.

3. The transmission apparatus of claim 2 wherein the one-way clutch is active when relative speed of the primary turbine and impeller is below a predetermined value.

4. The transmission apparatus of claim 2 wherein the one-way clutch is inactive when relative speed of the primary turbine and the impeller is above a predetermined value.

5. The transmission apparatus of claim 4 further comprising a second one-way clutch connected to the stator and to ground, and wherin the second one-way clutch is active until relative speed of the primary turbine and impeller reaches a predermined value.

6. The transmission apparatus of claim 5 wherein the second one-way clutch is inactive when relative speed of the primary turbine and impeller is above a predetermined value.

7. The transmission apparatus of claim 1 wherein, in a foward drive operation of the transmission, the first clutch is active locking the second ring gear to the second sun gear and thus locking the second planetary gear set, whereby power from the primary turbine is transmitted through the first carrier and is transmitted dirctly through the lock up secondary planetary gear set to the output shaft.

8. The transmission apparatus of claim 7 wherein the one-way clutch is inactive when the first clutch is engaged.

9. The transmission apparatus of claim 8 further comprising a second one-way clutch connected to the stator and to ground, and wherein the second one-way clutch is active until relative speed of the primary turbine and impeller reaches a predetermined value.

10. The transmission apparatus of claim 9 wherein the second one-way clutch is inactive when relative speed of the primary turbine and impeller is above a predetermined avalue.

11. The transmission apparatus of claim 1 wherein a reverse arrangement between the input shaft and the output shaft is with the first brake engaged, thereby locking the primary turbine, the first planetary carrier and the second ring gear, whereby power is transmitted by the secondary turbine through the first sun gear and first planet gears to the firt ring gear from there through the one-way clutch and through the second sun gear to the second carrier and then to the output shaft in the reverse direction.

* * * * *